United States Patent
Shin et al.

(10) Patent No.: US 8,764,270 B2
(45) Date of Patent: Jul. 1, 2014

(54) DISPLAY DEVICE

(75) Inventors: Dong-Lyoul Shin, Suwon-si (KR); Hyun-Seok Hong, Daejeon (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 767 days.

(21) Appl. No.: 12/605,842

(22) Filed: Oct. 26, 2009

(65) Prior Publication Data

US 2010/0157574 A1    Jun. 24, 2010

(30) Foreign Application Priority Data

Dec. 24, 2008  (KR) .......................... 10-2008-0133642

(51) Int. Cl.
*F21V 7/04* (2006.01)

(52) U.S. Cl.
CPC .................................. G02B 6/0011 (2013.01)
USPC .......................................... 362/630; 362/276

(58) Field of Classification Search
CPC ....... G02B 6/00; G02B 6/0001; G02B 6/0011
USPC ...................... 362/97.1–97.4, 276, 600–634; 349/61–69
See application file for complete search history.

(56) References Cited

U.S. PATENT DOCUMENTS

| 6,466,312 B1 * | 10/2002 | Li ................................. 356/218 |
| 2007/0290985 A1 * | 12/2007 | Matsumoto et al. .......... 345/102 |
| 2008/0198297 A1 * | 8/2008 | Choi et al. ..................... 349/65 |

FOREIGN PATENT DOCUMENTS

| JP | 2004-199968 | 7/2004 |
| JP | 2007-122954 | 5/2007 |
| JP | 2007-256405 | 10/2007 |
| KR | 1020080055476 | 6/2008 |

* cited by examiner

*Primary Examiner* — Jason Moon Han
(74) *Attorney, Agent, or Firm* — F. Chau & Associates, LLC

(57) ABSTRACT

A display device includes a display panel displaying an image, a light source generating light, a light guide plate guiding the light and supplying the light to the display panel, a receiving container receiving the light source and the light guide plate, the receiving container including a sidewall portion adjacent to the light guide plate and a bottom portion extending from the sidewall portion, a photosensor coupled to the receiving container, the photosensor sensing the light, and a light receiving hole formed in the receiving container, the light receiving hole comprising a first end and a second end, the first end being closer to the light guide plate and the second end being closer to the photosensor, wherein a height of the first end is smaller than a thickness of the light guide plate, and the second end overlaps the photosensor.

20 Claims, 6 Drawing Sheets

DISPLAY DEVICE

CROSS-REFERENCE TO RELATED APPLICATION

This application claims priority from Korean Patent Application No. 10-2008-0133642 filed on Dec. 24, 2008, the disclosure of which is incorporated herein by reference in its entirety.

BACKGROUND OF THE INVENTION

1. Technical Field

The present disclosure relates to a display device having a light sensor, and more particularly, to a display device having a light sensor receiving light through a light receiving hole.

2. Discussion of the Related Art

A liquid crystal display (LCD) includes two substrates on which field-generating electrodes are formed, and a liquid crystal layer that is interposed between the two substrates. In the LCD, a voltage is applied to the electrodes to rearrange the liquid crystal molecules of the liquid crystal layer, thereby controlling the quantity of transmitted light to display an image.

The LCD includes a photosensor receiving light through a light receiving hole for measuring the brightness level of the light. When the light supplied from a light source is incident into the light receiving hole through, for example, various optical sheets or a light guide plate, the photosensor measures the brightness of mixed-color light. However, a change of positional relationship between the light receiving hole and the photosensor may cause an inaccurate measurement of the brightness level. The change of positional relationship can occur when the LCD is deformed due to, for example, heat.

SUMMARY OF THE INVENTION

According to an exemplary embodiment of the present invention, a display device comprises a display panel displaying an image, a light source generating light, a light guide plate guiding the light and supplying the light to the display panel, a receiving container receiving the light source and the light guide plate, the receiving container including a sidewall portion adjacent to the light guide plate and a bottom portion extending from the sidewall portion, a photosensor coupled to the receiving container, the photosensor sensing the light, and a light receiving hole formed in the receiving container, the light receiving hole comprising a first end and a second end, the first end being closer to the light guide plate and the second end being closer to the photosensor, wherein a height of the first end is smaller than a thickness of the light guide plate, and the second end overlaps the photosensor.

The height of the first end can be about one third (⅓) or less than the thickness of the light guide plate.

The first end can be formed in the sidewall portion, and the second end is formed in the bottom portion.

The first end can be formed adjacent to the bottom portion.

An entire portion of the first end may overlap the light guide plate.

The display device may further comprise a light adjusting member interposed between the second end and the photosensor.

The light adjusting member may overlap the first end or the second end.

The light adjusting member may comprise a diffusive sheet.

The second end can have an area greater than that of the first end.

The first end and the second end can have the same area.

The light receiving hole can be formed substantially at a lower end of the sidewall portion.

The light receiving hole can be formed substantially at a center of the sidewall portion.

The light receiving hole can receive only the light passing through the light guide plate.

The photosensor can be disposed in a groove formed in the sidewall portion or the bottom portion.

The first end can be oriented substantially perpendicular to the second end.

According to an exemplary embodiment of the present invention, a display device comprises a light source providing light, a receiving container including a sidewall portion, a bottom portion, and a seating portion, a light guide plate guiding the light, the light guide plate having a first side and a second side, the first side faces the bottom portion and the second side faces the sidewall portion of the receiving container, a light receiving hole comprising a first end and a second end, the light receiving hole formed through the receiving container, and a photosensor disposed at near the second end of the light receiving hole, the photosensor sensing the light received from the light receiving hole, wherein the first end of the light receiving hole completely overlaps the second side of the light guide plate.

The display device may further comprise a display panel disposed on the seating portion of the receiving container.

The first end may face a first direction and the second end may face a second direction, and the first direction can be substantially perpendicular with respect to the second direction.

The first end can face a first direction and the second end can face a second direction, and the first direction can be substantially parallel with the second direction.

A size of the first end can be substantially smaller than a size of the second side.

A size of the first end can be smaller than a size of the second end.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein.

Figure 1:
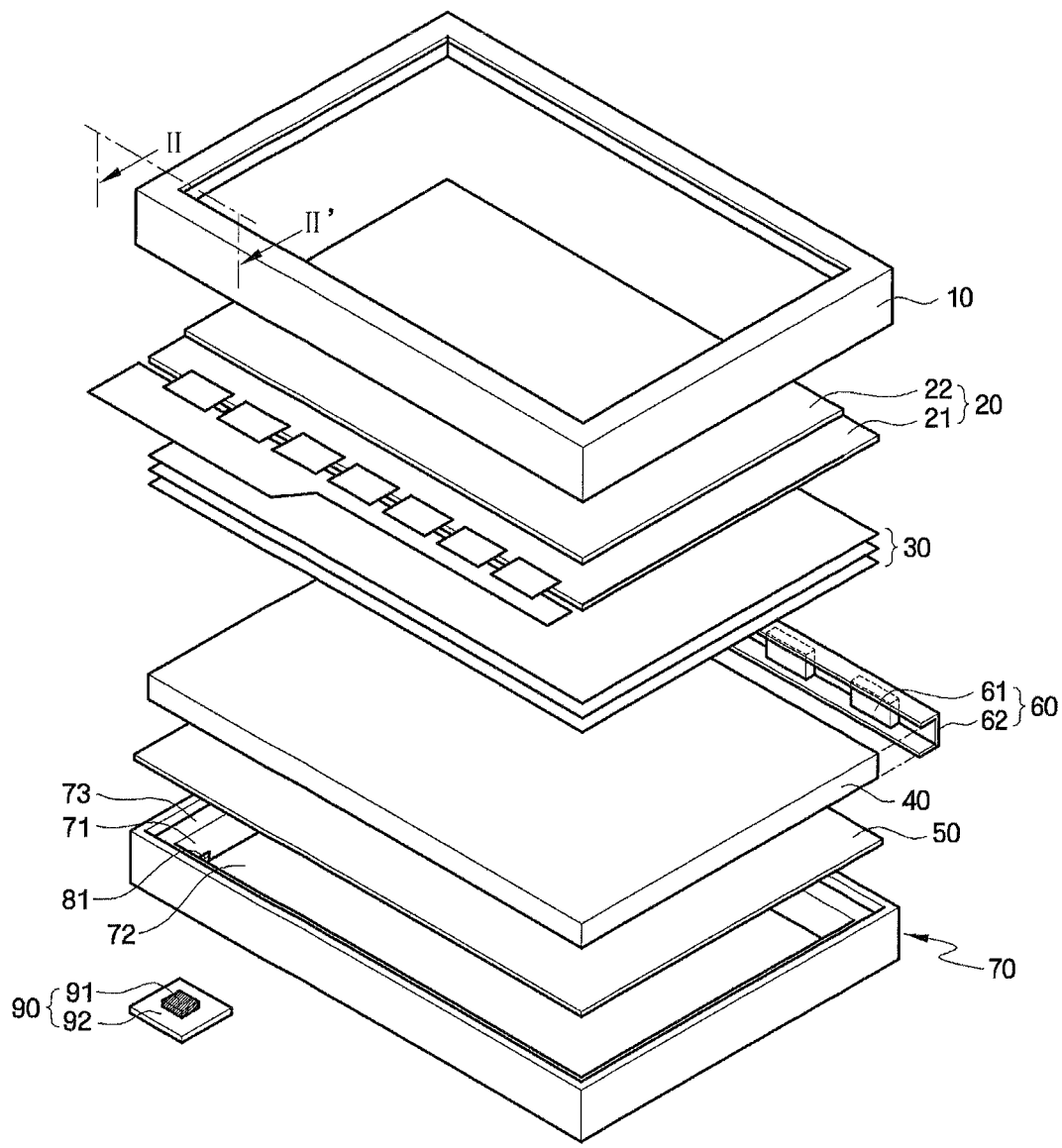
FIG. 1 is an exploded perspective view of a display device according to an exemplary embodiment of the present invention.
Figure 2:
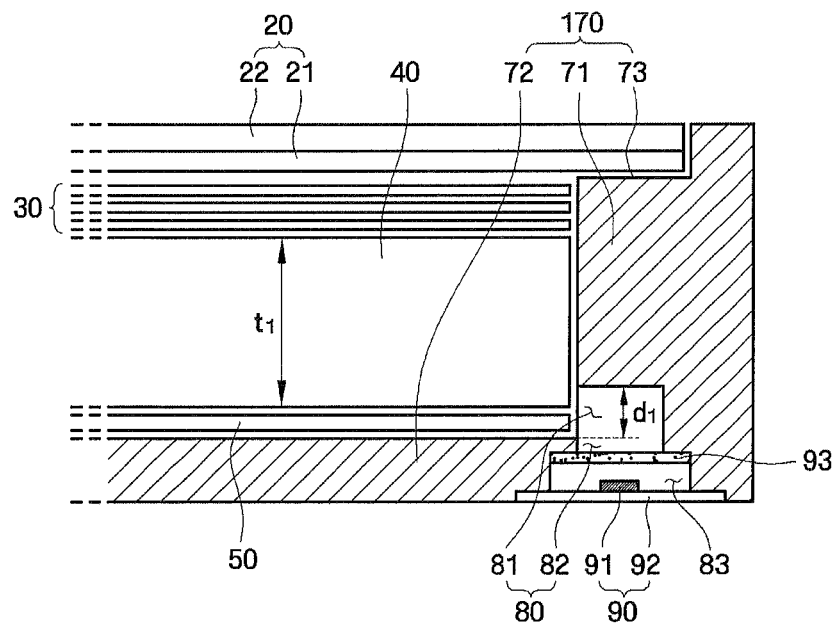
FIG. 2 is a cross-sectional view taken along line the II-II' of FIG. 1 according to an exemplary embodiment of the present invention.
Figure 3:
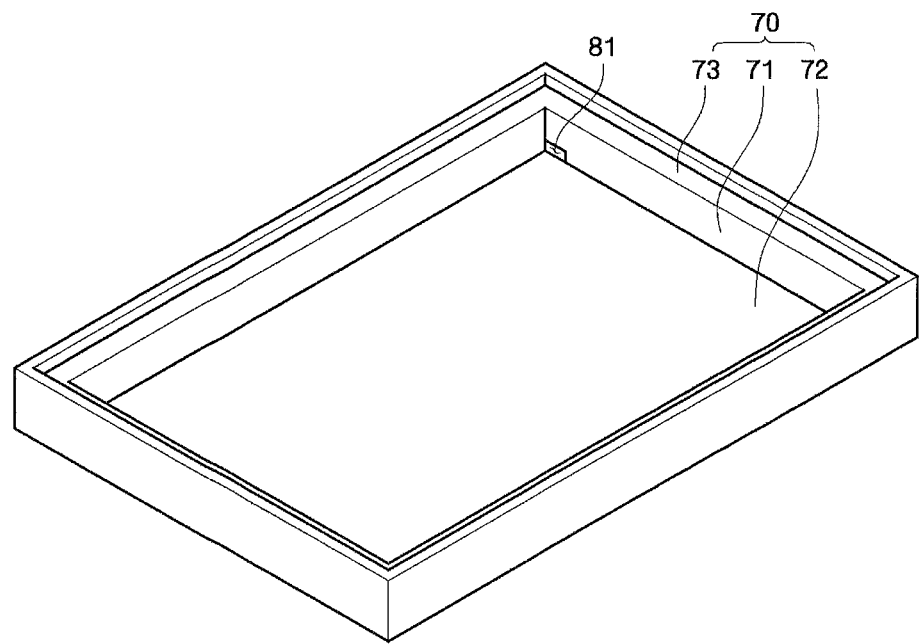
FIG. 3 is a perspective view illustrating a receiving container of a display device according to an exemplary embodiment of the present invention.
Figure 4:
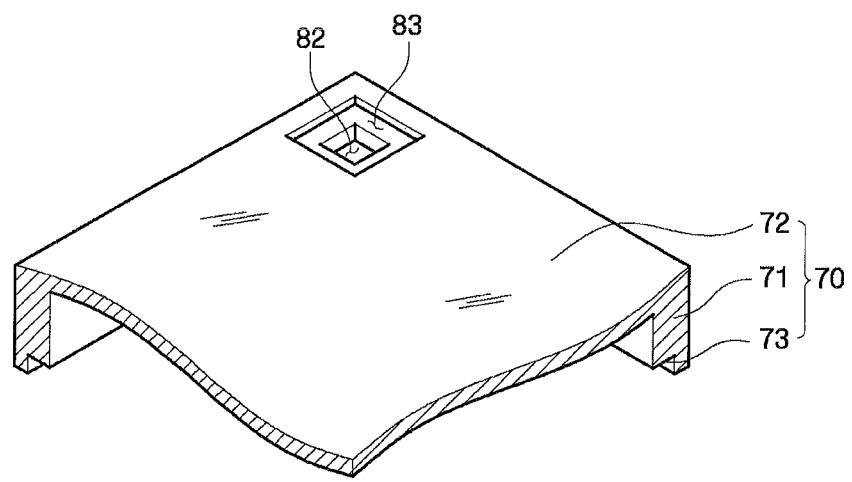
FIG. 4 is a perspective view illustrating a bottom surface of a receiving container according to an exemplary embodiment of the present invention.

A display device according to an exemplary embodiment of the present invention is described in connection with FIGS. 1 and 2. FIG. 1 is an exploded perspective view of a display device according to an exemplary embodiment of the present invention. FIG. 2 is a cross-sectional view taken along the line II-II' of FIG. 1.

Referring to FIGS. 1 and 2, a display device includes a display panel 20, an upper receiving container 10, optical sheets 30, a light guide plate 40, a light source assembly 60, a sensor assembly 90, a reflective sheet 50, and a lower receiving container 70.

The display panel 20 may include a lower substrate 21, an upper substrate 22, and a liquid crystal layer interposed between the lower and upper substrates 21 and 22.

The lower substrate 21 includes a gate line, a data line, a thin film transistor (TFT) array, and pixel electrodes. The upper substrate 22 includes a black matrix and a common electrode. The upper substrate 22 is disposed to face the lower electrode 21. The display panel 20 displays image information.

The brightness of light supplied from a light source can be adjusted to improve display quality. The brightness of light can be adjusted by measuring a brightness level of light supplied from the light source and feeding back the brightness level.

The upper receiving container 10 forms the outer appearance of the display device and provides a space to receive the display panel 20. The upper receiving container 10 has an opening window formed in the central portion, through which the display panel 20 is exposed.

The upper receiving container 10 is combined with the lower receiving container 70. The display panel 20, the optical sheet 30, the light guide plate 40 and the light source assembly 60 are accommodated within the upper receiving container 10 and the lower receiving container 70.

The optical sheet 30 diffuses and collects the light from the light guide plate 40. The optical sheet 30 is disposed above the light guide plate 40 and within a sidewall portion 71 of the lower receiving container 70.

The optical sheets 30 may include, for example, a first prism sheet, a second prism sheet, and a diffusive sheet.

The brightness of light within an effective viewing angle increases when the first and second prism sheets collect light, which is refracted through the light guide plate 40 and enters the prism sheets with a narrow angle, from a front direction.

The diffusive sheet disposed below the first and second prism sheets diffuses the light to make the light uniformly distributed. The diffusive sheet diffuses the light emitted from the light guide plate 40 in various directions, thereby preventing bright and dark portions from being generated in the light guide plate 40. The bright and dark portions can be observed by a viewer. In an exemplary embodiment, one or two optical sheets having the characteristics of a prism sheet and a diffusive sheet may be used.

The light guide plate 40 guides the light provided from a light source 61 toward the display panel 20. The light guide plate 40 can be a transparent panel comprising a plastic-based transparent material such as, for example, PMMA (polymethymethacrylate). The light guide plate 40 allows the light generated from the light source 61 to travel toward the display panel 20 disposed above the light guide plate 40. Thus, various patterns for changing the traveling direction of the light incident into the light guide plate 40 into the direction toward the display panel 20 are printed on the bottom surface of the light guide plate 40.

In an embodiment, the optical sheet 30 and the light guide plate 40 may be provided as separate components. Alternatively, the light guide plate 40 including the characteristics of the optical sheet 30 may be used.

The light source assembly 60 generates light. The generated light is supplied to the display panel 20. The light source assembly 60 may include the light source 61 and a light source cover 62. The light source 61 is positioned at a lateral side of the light guide plate 40, and supplies light through the lateral side of the light guide plate 40. The light source 61 may be disposed at one side of the light guide plate 40, or at both sides of the light guide plate 40 according to an exemplary embodiment of the present invention. The light source 61 may include light emitting diodes (LEDs). The LEDs are point light sources, and may be arranged at a predetermined interval along the lateral side of the light guide plate 40. The light source 61 may include independent emitter chips emitting red light, green light and blue light, respectively. Alternatively, the light source 61 may emit white light obtained by mixing red light, green light and blue light. In an exemplary embodiment, the red light, green light and blue light can be independently adjusted to then emit white light having an optimum color temperature. The color temperature refers to a quantitative expression of an absolute temperature of a black body that radiates visible rays. Different color tones of light are perceived according to the color temperature. Accordingly, the color spectrum of an image displayed on the display panel 20 may vary according to the color temperature.

When using an LED including emitter chips emitting red light, green light and blue light as the light source 61, the respective color emitter chips are controlled, and the color temperature can be adjusted. Since the range of adjustable color temperatures varies according to various factors, a feedback system can be employed to maintain the color temperature to be consistently under the optimal condition.

In an exemplary embodiment, the light source 61 can include the LED, or a lamp such as, for example, a cold cathode fluorescent lamp (CCFL) or a hot cathode fluorescent lamp (HCFL).

The reflective sheet 50 disposed below the light guide plate 40 upwardly reflects the light which is emitted downwardly from the light guide plate 40, thereby increasing the efficiency of light.

The sensor assembly 90 measures the brightness of light supplied from the light source 61, and includes a photosensor 91 and a sensor board 92. The photosensor 91 can measure brightness levels of red light, green light and blue light, respectively. In an exemplary embodiment, the photosensor 91 may include independent photodiodes measuring the red light, green light and blue light, respectively. The photosensor 91 attached to the sensor board 92 may be disposed on a bottom portion 72 of the lower receiving container 70.

The lower receiving container 70 includes four sidewalls enclosing the light source assembly 60, the light guide plate 40 and the reflective sheet 50. The lower receiving container 70 also includes the bottom portion 72. The sidewall portion 71 adjacent to lateral surfaces of the light guide plate 40, forms the four walls of the lower receiving container 70. The bottom portion 72 extending to the sidewall portion 71, forms a bottom surface of the lower receiving container 70.

A top surface of the sidewall portion 71 forms a seating portion 73 on which the display panel 20 is disposed. The seating portion 73 allows the display panel 20 to be disposed without a planar movement by forming the top surface of the sidewall portion 71 to have a stepped portion. The seating portion 73 may be formed on all or some of the four sidewalls according to an embodiment of the present invention.

The lower receiving container 70 may be formed by an injecting method using a mold. A sensor insertion groove 83 into which the sensor assembly 90 is inserted is formed on the bottom portion 72 of the lower receiving container 70. The sensor insertion groove 83 may be recessed inwardly from the exterior side of the bottom portion 72 of the lower receiving container 70. The sensor insertion groove 83 is connected to the light receiving hole 80 perforating one end of the sidewall portion 71.

The light receiving hole 80 guides the light passing through the light guide plate 40 to travel toward the photosensor 91. In an exemplary embodiment, the light receiving hole 80 guides only the light supplied directly from the light guide plate 40 after being emitted from the light source 61. Then, the light travels toward the photosensor 91. The light directly emitted from the light source 61 or the light emitted via the optical sheet 50 or the display panel 20 is prevented from passing through the light receiving hole 80.

The light receiving hole 80 includes a first end 81 into which the light having passed through the light guide plate 40 is incident, and a second end 82 from which the incident light is emitted toward the photosensor 91. The first end 81 may be formed at one end of the sidewall portion 71, and the second end 82 may be formed at one side of the bottom portion 72. The first end 81 is close to the light guide plate 40 and the second end 82 is close to the photosensor 91. The light from the light guide plate 40 passes through the first end 81 and through the second end 82 sequentially. In an exemplary embodiment, the first end 81 faces a first direction and the second end 82 faces a second direction, wherein the first direction and the second direction are substantially perpendicular with respect to each other.

The light passing through the light guide plate 40 is incident into the first end 81 and is reflected inside the light receiving hole 80. Then, the light exits through the second end 82. In the light receiving hole 80, the photosensor 91 can measure the brightness of light accurately because the photosensor 91 measures a brightness deviation based on relative quantities of light.

The light receiving hole 80 may be formed at a corner of the lower receiving container 70 corresponding to one end of the sidewall 71. In an exemplary embodiment, the first portion 81 may be formed in the vicinity of the bottom portion 72.

The first end 81 may be formed such that a thickness-directional height ($d_1$) of the first end 81 is smaller than a thickness ($t_1$) of the light guide plate 40. The thickness-directional height ($d_1$) corresponds to a vertical direction in FIG. 2 ranging from the bottom portion 72 of the lower receiving container 70 to the seating portion 73, which is the same as the direction along which the thickness ($t_1$) of the light guide plate 40 is measured.

The term 'thickness-directional height of light guide plate,' which is used to compare a size of the first portion 81 with the thickness of the light guide plate 40, refers to the direction ranging from the bottom portion 72 of the bottom receiving container 70 to the seating portion 73.

Since the first end 81 is formed to receive only the light passing through the light guide plate 40, the thickness-directional height ($d_1$) can be smaller than one third ⅓ the thickness ($t_1$) of the light guide plate 40 according to an exemplary embodiment of the present invention. The light guide plate 40, the optical sheet 30 and the bottom receiving container 70, which are provided in the display device, may be deformed according to the change of temperature, resulting in a change in the relative positional relationship between the light guide plate 40 and the first end 81. Thus, even if the relative positional relationship between the light guide plate 40 and the first end 81 is changed, the thickness-directional height ($d_1$) of the first end 81 is smaller than about one third (⅓) the thickness ($t_1$) of the light guide plate 40, so that the light passing through a portion other than the light guide plate 40 cannot pass through the first end 81.

To measure the quantity of the light incident through the light receiving hole 80, the sensor assembly 90 is arranged such that the photosensor 91 overlaps the second end 82. In an exemplary embodiment, an area of the second end 82 may be larger than that of the photosensor 91.

According to an exemplary embodiment of the present invention, even if there is a change in the relative positional relationship between each component including the photosensor 91, the light receiving hole 80, and a light adjusting member 93, the quantity of the light incident into the photosensor 91 can be maintained to be substantially the same by forming the area of the second end 82 larger than that of the photosensor 91.

The sensor assembly 90 may be inserted into the sensor insertion groove 83 such that the photosensor 91 faces the second end 82, thereby positioning the sensor assembly 90 parallel with respect to the outer surface of the bottom portion 72 of the lower receiving container 70. At least one unit of the sensor assembly 90 may be formed at one corner of the lower receiving container 70. In an exemplary embodiment, at least one sensor assembly 90 may be formed at one corner of the lower receiving container 70 or at the center of the sidewall portion 71. If the sensor assembly 90 is formed on one or more positions of the lower receiving container 70, a positional deviation can be minimized, thereby increasing the measurement accuracy.

The photosensor 91 measures the light passing through the light adjusting member 93. In an exemplary embodiment, the light adjusting member 93 is interposed between the light guide plate 40 and the photosensor 91 and overlaps the photosensor 91, thereby reducing the brightness of the light emitted from the light guide plate 40. As such, the light having the reduced brightness is incident into the photosensor 91.

Figure 5:
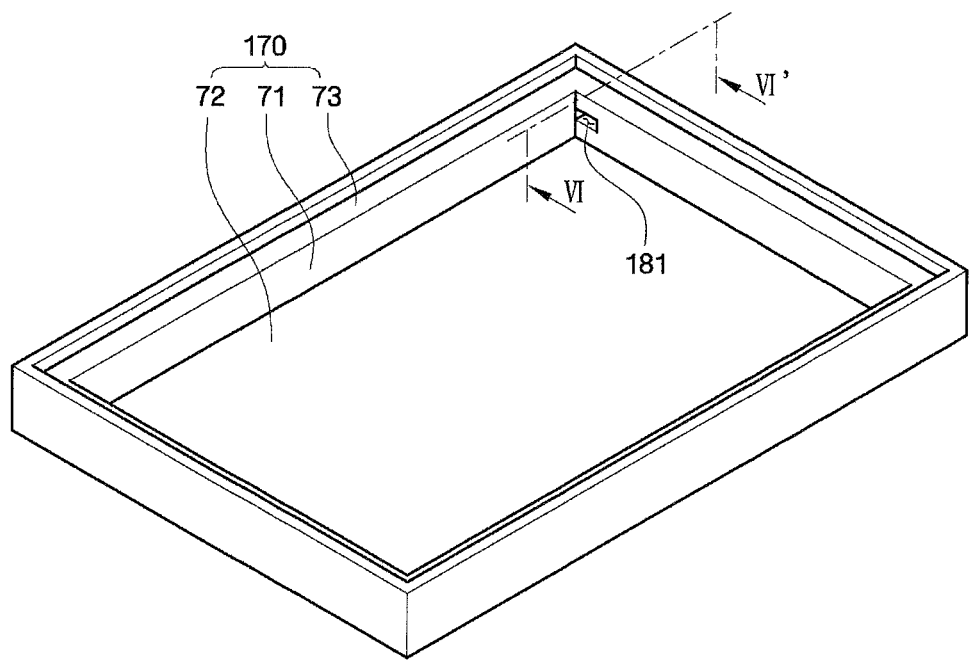
FIG. 5 is a perspective view illustrating a receiving container of a display device according to an exemplary embodiment of the present invention.
Figure 6:
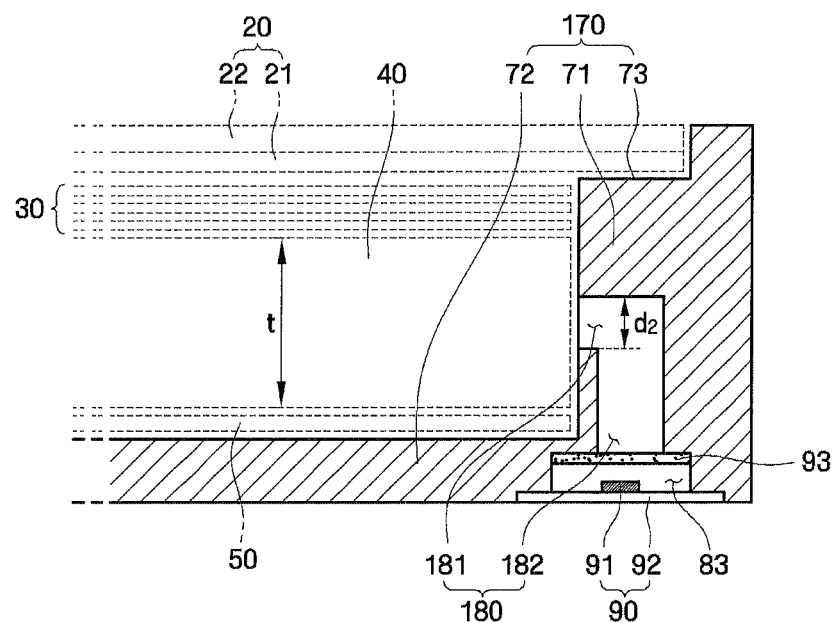
FIG. 6 is a cross-sectional view taken along the line VI-VI' of FIG. 5 according to an exemplary embodiment of the present invention.

A display device according to an exemplary embodiment of the present invention is described in connection with FIGS. 5 and 6. FIG. 5 is a perspective view illustrating a receiving container of a display device according to an exemplary embodiment of the present invention. FIG. 6 is a cross-sectional view taken along line the VI-VI' of FIG. 5 according to an exemplary embodiment of the present invention.

Referring to FIGS. 5 and 6, a first end 181 of a light receiving hole 180 completely overlaps a lateral surface of the light guide plate 40.

The sensor insertion groove 83 into which the sensor assembly 90 is inserted is formed in the bottom portion 72 of a bottom receiving container 170. The sensor insertion groove 83 is inwardly recessed from the exterior side of the bottom portion 72 of the lower receiving container 170. The sensor insertion groove 83 has a light receiving hole 180 connected thereto and perforating an end of the sidewall portion 71.

The first end 181 may completely overlap the light guide plate 40 so that the light receiving hole 180 guides only the light directly emitted from the light source 61 via the light guide plate 40 toward the photosensor 91.

The first end 181 may be formed at one end of the sidewall portion 71. A second end 182 may be formed at one side of the bottom portion 72. In an exemplary embodiment, the first end 181 faces a first direction and the second end 182 faces a second direction, wherein the first direction and the second direction are substantially perpendicular with respect to each other. Accordingly, the light incident through the first end 181 may be internally reflected in the light receiving hole 180 and then emitted to the second end 182. In an exemplary embodiment, the brightness of the internally reflected light in the light receiving hole 180 may be adjusted to be sensed by the photosensor 91. In an exemplary embodiment, since the photosensor 91 can measure a change of brightness levels based on relative light quantity, the measured brightness level of light is not affected even when the brightness of light is reduced due to the light that is internally reflected in the light receiving hole 180.

Referring to FIG. 6, the first end 181 may be positioned at the center of the light guide plate 40, thereby forming the light receiving hole 180 elongated from the first end 181 to the second end 182. In an exemplary embodiment, it is possible to prevent the light having passed through the portion other than the light guide plate 40 from reaching the photosensor 91 by elongating the light receiving hole 180 and changing the passage of the light from the first direction to the second direction.

The light receiving hole 180 may be formed at a corner of the lower receiving container 170, for example, one end of the sidewall portion 71, or at a center of the sidewall portion 71. In an exemplary embodiment, the first end 181 may be spaced apart from the bottom portion 72 to be positioned at the center of the light guide plate 40. In an exemplary embodiment, the position of the first end 181 may be adjusted in various manners according to the thickness of the light guide plate 40. In an exemplary embodiment, a wedge-type light guide plate becomes thinner in a direction away from the light receiving portion, i.e., as the light guide plate is tapered in a direction away from a light receiving portion where a light source 61 is positioned. In the wedge-type light guide plate, the first end 181 may be positioned in the vicinity of the bottom portion 72.

The first end 181 may be formed such that a thickness-directional height ($d_2$) of the first end 181 is smaller than a thickness (t) of the light guide plate 40. Since the first end 181 is formed to receive only the light passing through the light guide plate 40, the thickness-directional height ($d_2$) of the first end 181 can be smaller than about one third (⅓) of the thickness (t) of the light guide plate 40.

Because a thickness of the wedge-type light guide plate tapers away from the light receiving portion where the light source 61 is positioned, the thickness of the light guide plate 40 can be reduced to about 1 mm or less. In this exemplary embodiment, the thickness-directional height ($d_2$) of the first end 181 may be substantially the same as the thickness (t) of the light guide plate 40 at the tapered end.

The sensor assembly 90 may be inserted into the sensor insertion groove 83 such that the photosensor 91 completely overlaps the second end 182. For example, the photosensor 91 may be fixed on a sensor board 92. In an exemplary embodiment, the photosensor 91 may be disposed inside the light receiving hole 180.

A light adjusting member 93 may be interposed between the light guide plate 40 and the photosensor 91. The light adjusting member 93 can reduce the brightness of light or can transmit only a predetermined wavelength, thereby controlling the light to be under optimal conditions when the light is incident into the photosensor 91.

Referring to FIG. 6, the light adjusting member 93 may be formed in the sensor insertion groove 83 to completely overlap the second end 182. In exemplary embodiments, the light adjusting member 93 may be formed on the sidewall portion 71 or inside the light receiving hole 180 to overlap the first end 181.

The light adjusting member 93 may be formed on a lateral surface of the light guide plate 40 completely overlapping the first end 181.

The photosensor 91 may be positioned at the center of the second end 182 such that the photosensor 91 completely overlaps the second end 182. In an exemplary embodiment, an area of the second end 182 may be larger than that of the photosensor 91.

According to an exemplary embodiment, even if there is a change in the relative positional relationship between each of the various components including the photosensor 91, the light receiving hole 180 and the light adjusting member 93, the quantity of light incident into the photosensor 91 can be maintained to be substantially the same by forming the area of the second end 182 larger than that of the photosensor 91.

Figure 7:
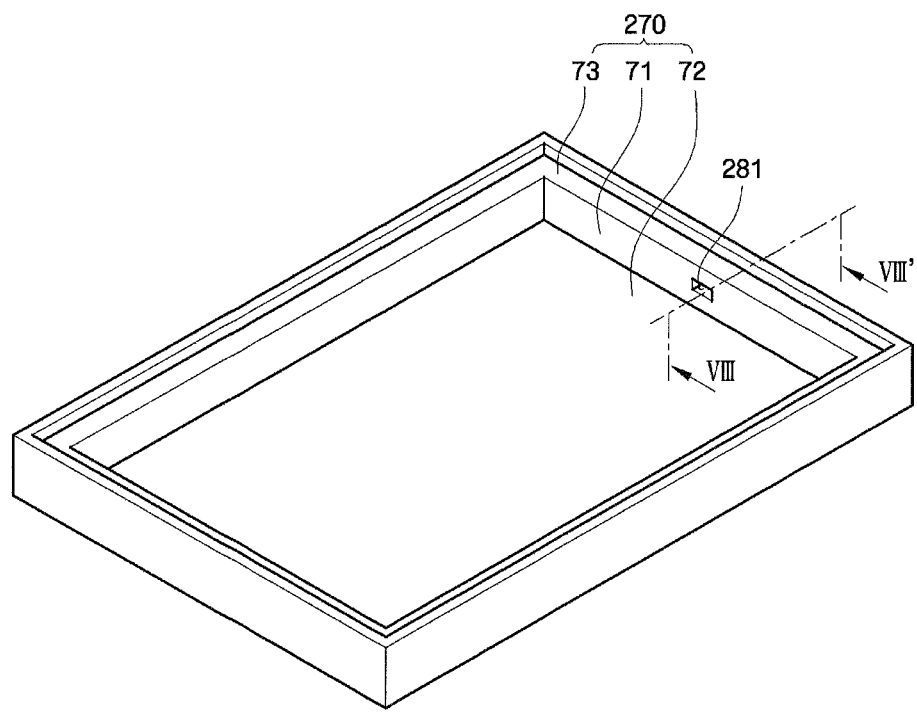
FIG. 7 is a perspective view illustrating a receiving container of a display device according to an exemplary embodiment of the present invention.
Figure 8:
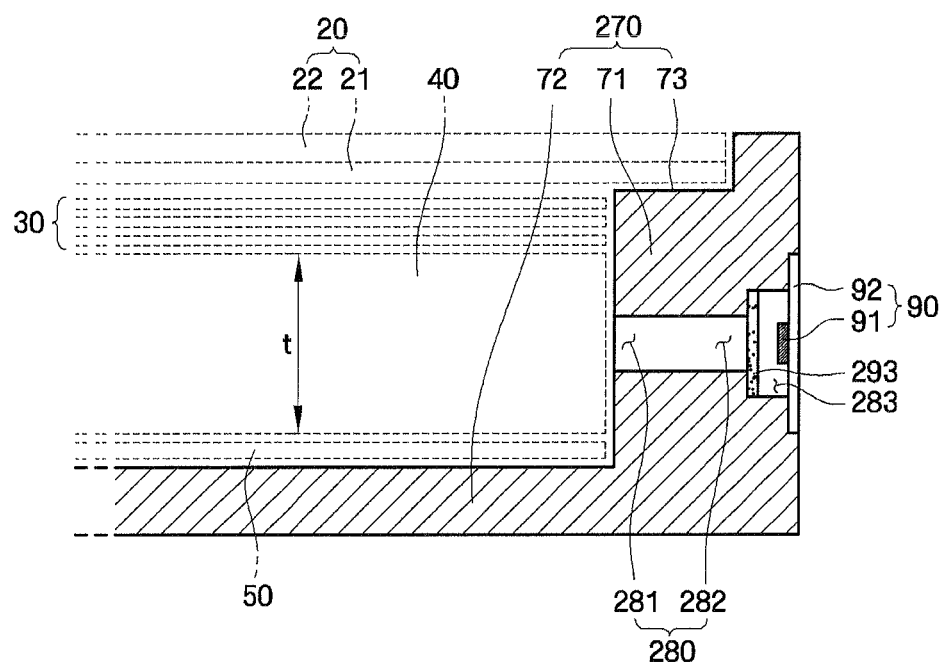
FIG. 8 is a cross-sectional view taken along the line VIII-VIII' of FIG. 7 according to an exemplary embodiment of the present invention.

A display device according to an exemplary embodiment of the present invention is described in connection with FIGS. 7 and 8. FIG. 7 is a perspective view illustrating a receiving container of a display device according to an exemplary embodiment of the present invention. FIG. 8 is a cross-sectional view taken along the line VIII-VIII' of FIG. 7 according to an exemplary embodiment of the present invention.

A light receiving hole 280 has a first end 281 and a second end 282. The first end 281 and the second end 282 are aligned along a straight line.

In an exemplary embodiment, the light receiving hole 280 may perforate one end of a sidewall portion 71 of a lower receiving container 270. The photosensor 91 may be completely exposed to the light guide plate 40 through the light receiving hole 280.

A sensor insertion groove 283 into which the sensor assembly 90 is inserted is formed in the sidewall portion 71 of the lower receiving container 270. The sensor insertion groove 283 may be recessed inwardly from the exterior side of the sidewall portion 71. The sensor insertion groove 283 is connected to the light receiving hole 280 perforating one end of the sidewall portion 71.

The light receiving hole 280 completely overlaps the light guide plate 40 to guide the light passing through the light guide plate 40 toward the photosensor 91. For example, the light receiving hole 280 guides only the light supplied directly from the light guide plate 40 after being emitted from the light source 61. The light then travels toward the photosensor 91.

The first end 281 may be formed at one end of the sidewall portion 71. The second end 282 may be formed on the exterior surface of the sidewall portion 71. The light receiving hole 280 has the first end 281 and the second end 282 aligned along the straight line, thereby preventing the light from being lost within the light receiving hole 280 due to reflection. In an exemplary embodiment, the diameter of the light receiving hole 280 may be further reduced. The light incident from a portion other than the light guide plate 40 can be blocked by reducing the area of the first end 281 or the second end 282.

The light receiving hole 280 may be formed at a corner of the bottom receiving container 270, for example, one end of the sidewall portion 71, or at a center of the sidewall portion 71. In an exemplary embodiment, the first end 281 may be spaced apart from the bottom portion 72 to be positioned substantially at the center of the light guide plate 40. In an exemplary embodiment, the position of the first end 281 may be adjusted in various manners according to the thickness of the light guide plate 40.

The sensor assembly 90 may be inserted into a sensor insertion groove 283 such that the photosensor 91 completely overlaps the second end 282. For example, the photosensor 91 may be fixed on a sensor board 92. In an exemplary embodiment, the photosensor 91 may be disposed inside the light receiving hole 280.

In an exemplary embodiment, a light adjusting member 293 may be interposed between the light guide plate 40 and the photosensor 91. The light adjusting member 293 can reduce the brightness of light or can pass only a predetermined wavelength, thereby controlling the light to be under optimal conditions when the light incident into the photosensor 91.

Figure 9:
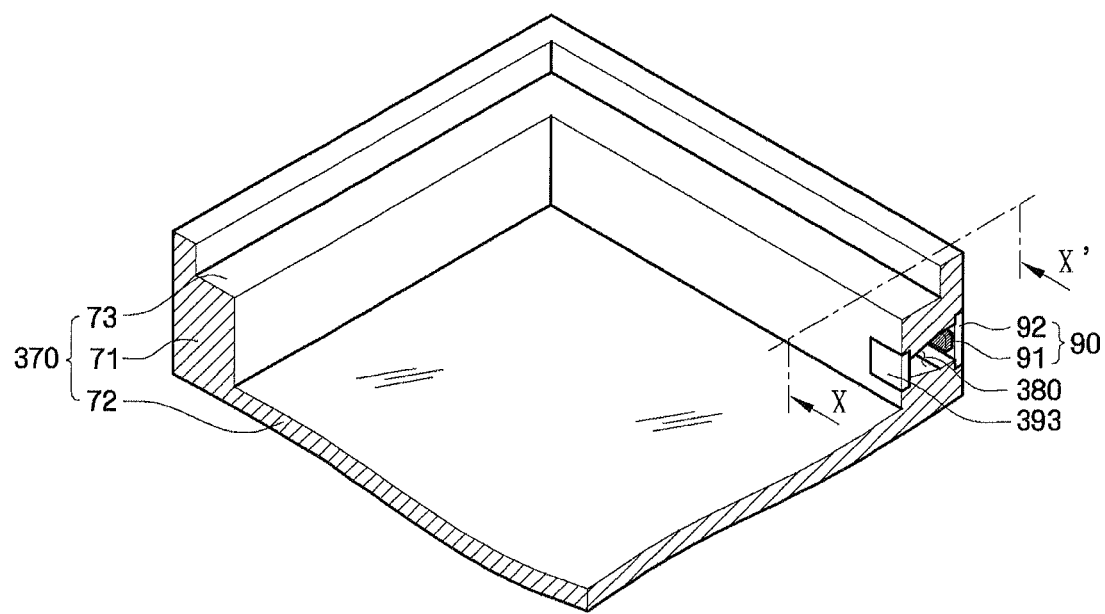
FIG. 9 is a perspective view illustrating a receiving container of a display device according to an exemplary embodiment of the present invention.
Figure 10:
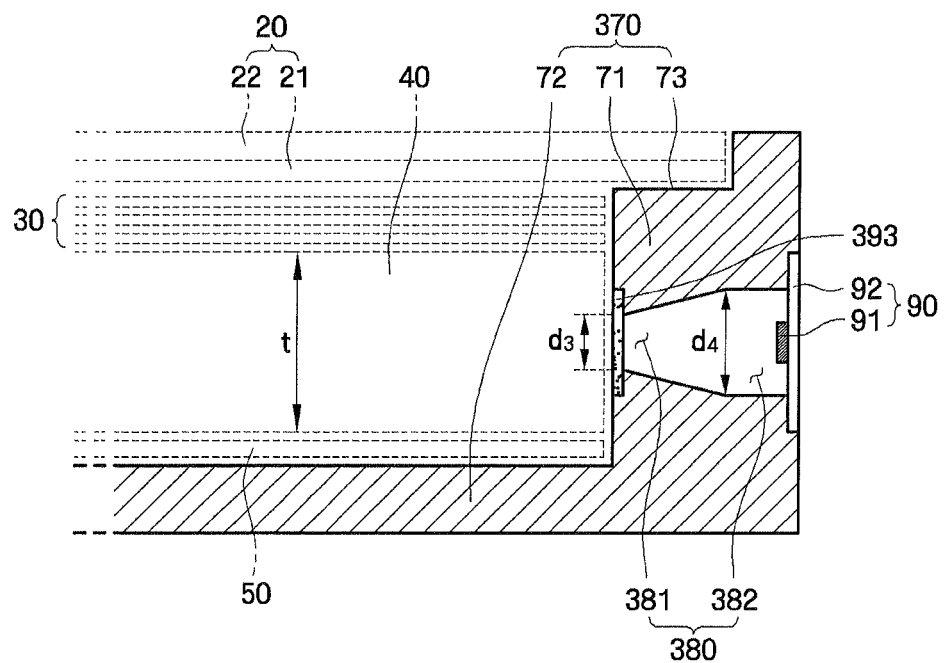
FIG. 10 is a cross-sectional view taken along the line X-X' of FIG. 9 according to an exemplary embodiment of the present invention.

A display device according to an exemplary embodiment of the present invention is described in connection with FIGS. 9 and 10. FIG. 9 is a perspective view illustrating a receiving container of a display device according to an exemplary embodiment of the present invention. FIG. 10 is a cross-sectional view taken along the line X-X' of FIG. 9 according to an exemplary embodiment of the present invention.

A light receiving hole 380 has a first end 381 and a second end 382, in which the first end 381 and the second end 382 are aligned along a straight line. An area of the second end 382 is larger than that of the first end 381.

In an exemplary embodiment, the light receiving hole 380 may perforate one end of a sidewall portion 71 of the lower receiving container 370. The cross-sectional area of the light receiving hole 380 gradually increases from the first end 381 to the second end 382. The area of the first end 381 can be minimized to prevent the light that does not pass through the light guide plate 40 from being incident thereto, and the area of the second end 382 can be increased to completely overlap the photosensor 91.

The first end 381 is a portion into which the light is incident from the light guide plate 40 and may be formed to completely overlap one lateral surface of the light guide plate 40. In an exemplary embodiment, when the light guide plate 40 is a wedge-type or a thin film type, the lateral surface of the light guide plate 40 formed in the vicinity of the first end 381 may have a very small thickness. For example, the first end 381 may have a thickness-directional height ($d_3$), which is much smaller than a height ($d_4$) of the second end 382.

To avoid a change in the relative positional relationship between the photosensor 91 and the second end 382 due to the thermal deformation, the area of the second end 382 may be adjusted such that the second end 382 completely overlaps the photosensor 91. When the area of the photosensor 91 cannot be reduced until the area of the photosensor 91 becomes smaller than that of the first end 381, the area of the second end 382 is formed to be larger than that of the first end 381. According to an exemplary embodiment of the present invention, the photosensor 91 receives only the light passing through the light guide plate 40 and measures the brightness of the light under a constant condition by minimizing the area of the first end 381 and forming the area of the second end 382 greater than that of the first end 381.

A light adjusting member 393 may be interposed between the light guide plate 40 and the photosensor 91. In an exemplary embodiment, the light adjusting member 393 may be formed on an inner surface of the sidewall portion 71. The area of the light adjusting member 393 can be minimized by forming the light adjusting member 393 between the light guide plate 40 and the entrance hole 381. In an exemplary embodiment, the light adjusting member 393 may be formed by bending one end of the optical sheet 30 or the reflective sheet 50.

Although the exemplary embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display device comprising:
    a display panel displaying an image;
    a light source generating light;
    a light guide plate guiding the light and supplying the light to the display panel;
    a receiving container receiving the light source and the light guide plate, the receiving container including a bottom portion, and a plurality of sidewall portions extending from each side of a perimeter of the bottom portion to form a recessed portion;
    a photosensor coupled to the receiving container, the photosensor sensing the light; and
    a light receiving hole comprising a first end formed in a sidewall portion of the plurality of sidewall portions adjacent to the light guide plate, and a second end, the first end being closer to the light guide plate and the second end being closer to the photosensor, wherein a height of the first end is smaller than a thickness of the light guide plate, and the second end overlaps the photosensor, wherein the photosensor does not overlap the light guide plate along an axis extending from the photosensor through the first end formed in the sidewall, wherein the axis is perpendicular with respect to the photosensor.

2. The display device of claim 1, wherein the height of the first end is about one third (⅓) or less than the thickness of the light guide plate.

3. The display device of claim 1, wherein the second end is formed in the bottom portion, the first end having an opening in a first plane, and the second end having an opening in a second plane substantially perpendicular to the first plane.

4. The display device of claim 1, wherein the first end is formed adjacent to the bottom portion.

5. The display device of claim 1, further comprising a light adjusting member interposed between the second end and the photosensor.

6. The display device of claim 5, wherein the light adjusting member overlaps the first end or the second end.

7. The display device of claim 5, wherein the light adjusting member comprises a diffusive sheet.

8. The display device of claim 1, wherein the second end has an area greater than that of the first end.

9. The display device of claim 1, wherein the first end and the second end have the same area.

10. The display device of claim 1, wherein the light receiving hole is formed substantially at a lower end of the sidewall portion.

11. The display device of claim 1, wherein the light receiving hole is formed substantially at a center of the sidewall portion.

12. The display device of claim 1, wherein the light receiving hole receives only the light passing through the light guide plate.

13. The display device of claim 1, Wherein the photosensor is disposed in a groove formed in the sidewall portion or the bottom portion.

14. The display device of claim 1, wherein the first end has an opening in a first plane, and the second end has an opening in a second plane substantially perpendicular to the first plane.

15. A display device comprising:
a light source providing light;
a receiving container including a bottom portion, a plurality of sidewall portions extending from each side of a perimeter of the bottom portion to form a recessed portion, and a seating portion;
a light guide plate guiding the light, the light guide plate having a first side and a second side, the first side faces the bottom portion and the second side faces a sidewall portion of the plurality of sidewall portions;
a light receiving hole comprising a first end formed in the sidewall portion of the plurality of sidewall portions adjacent the second side of the light guide pate, and a second end, the light receiving hole formed through the receiving container; and
a photosensor disposed at or near the second end of the light receiving hole, the photosensor sensing the light received from the light receiving hole, wherein the first end of the light receiving hole completely overlaps the second side of the light guide plate, wherein the photosensor does not overlap the light guide plate along an axis extending from the photosensor through the first end formed in the sidewall, wherein the axis is perpendicular with respect to the photosensor.

16. The display device of claim 15, further comprising a display panel disposed on the seating portion of the receiving container.

17. The display device of claim 15, wherein the first end has an opening in a first plane and the second end has an opening in a second plane, and the first plane is substantially perpendicular with respect to the second plane.

18. The display device of claim 15, wherein the first end faces a first direction and the second end faces a second direction, and the first direction is substantially parallel with the second direction.

19. The display device of claim 15, Wherein a size of the first end is substantially smaller than a size of the second side.

20. The display device of claim 15, wherein a size of the first end is smaller than a size of the second end.

* * * * *